June 11, 1929.   P. L. LACY   1,717,232

AUTOMATIC BACKSTOP FOR MOTOR VEHICLES

Filed Nov. 29, 1927

Phillip L. Lacy INVENTOR

BY Victor J. Evans ATTORNEY

WITNESS:

Patented June 11, 1929.

1,717,232

UNITED STATES PATENT OFFICE.

PHILLIP L. LACY, OF LOS ANGELES, CALIFORNIA.

AUTOMATIC BACKSTOP FOR MOTOR VEHICLES.

Application filed November 29, 1927. Serial No. 236,518.

This invention relates to an automatic back stop for motor vehicles, the general object of the invention being to provide means for preventing the vehicle from rolling backwardly when the gears are in any position except in reversing position, with means for holding the locking means of the back stop in neutral position when the gear shifting lever is placed in reverse gear position.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
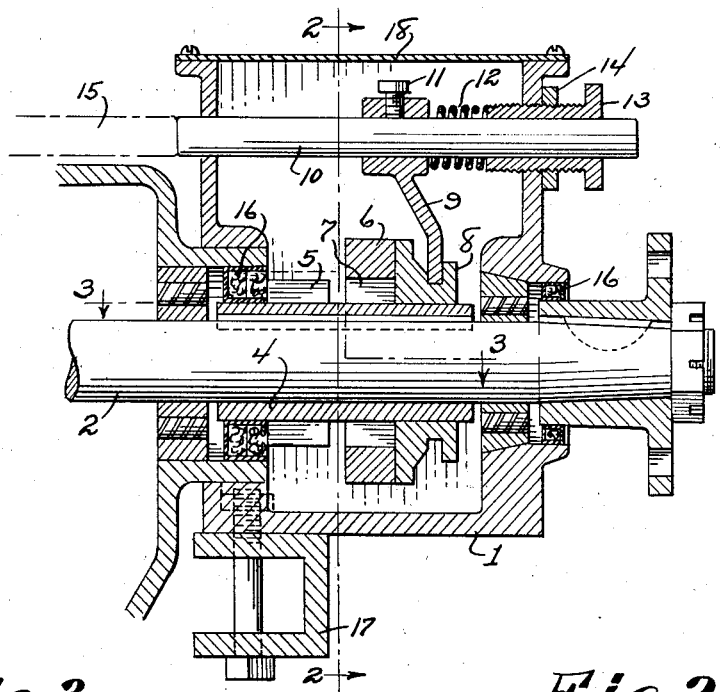
Figure 1 is a sectional view showing the device placed between the transmission means and the universal joint.
Figure 3:
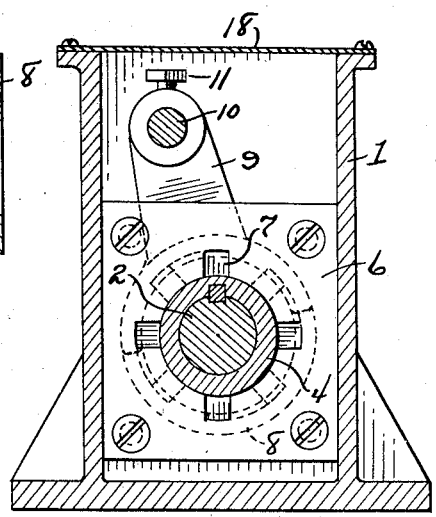
Figure 3 is a section on line 3—3 of Figure 1.
Figure 2:
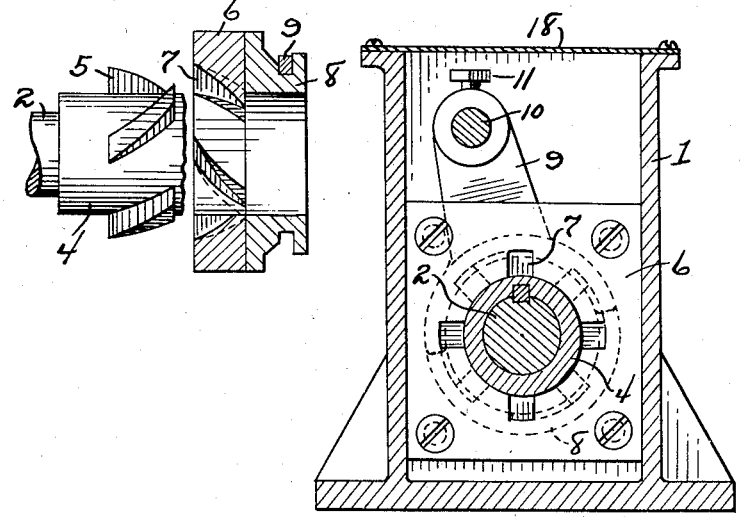
Figure 2 is a section on line 2—2 of Figure 1.

In these drawings, 1 indicates a housing placed between the transmission housing and the universal joint and having bearings therein for the transmission shaft 2 which is of greater length than the regular transmission shaft so that the shaft will extend through the housing 1. A sleeve 4 is arranged in the housing 1 and is keyed to the shaft 2, this sleeve being provided with the spiral teeth 5. A block 6 is slidably arranged in the housing 1, the side walls of the housing being machined so that the block can have free sliding movement therein. This block is provided with a central opening to receive the sleeve and the walls of the opening are formed with the spiral notches 7 for receiving the teeth 5. A grooved collar 8 is fastened to the rear face of the block and surrounds the sleeve and a fork 9 has its prongs engaging the groove in the collar. This fork is fastened to a plunger rod 10 arranged in the top of the housing by a set screw 11 and a coil spring 12 is arranged on the rod and bears against the fork and against the inner end of a nut member 13 which surrounds the rear end of the rod and is threaded in a hole formed in the rear side of the housing. A lock nut 14 holds the member 13 in adjusted position.

Thus it will be seen that the spring 12 tends to press the plunger rod and the fork forwardly and thus causes the fork to move the collar 8 and the block 6 against the teeth 5 so that if the shaft 2 starts to turn in a reverse direction, the teeth will engage the notches in the block and thus the shaft 2 will be locked against movement in a reverse direction. This, of course, will prevent the rear wheels of the vehicle from moving rearwardly and thus it will be impossible for the vehicle to move or roll backwardly. The spiral teeth and notches are so formed as to interengage each other when the shaft 2 moves in a reverse direction. When the shaft turns in the other direction, the rear ends of the teeth will simply slide over the front face of the block without engaging the notches.

When the gear shift lever is moved to reversing position, the plunger rod 15, which forms a part of the transmission means, will strike the rod 10 and move it rearwardly so that the block 6 will be held away from the teeth 5 and thus not interfere with the rotary movement of the shaft 2 in backing the vehicle.

As will be seen, the spring 12 can have its tension adjusted by turning the member 13 and packing means 16 are arranged in the front and rear of the housing to prevent lubricant placed in the housing from leaking out. The housing is adapted to be fastened to a part of the frame, as shown at 17, and it is provided with a removable cover 18.

From the foregoing it will be seen that the device automatically prevents a vehicle from rolling backwards when the gears are in any position other than reversing position, but as soon as the gear shifting lever is placed in reverse position, the device is moved to neutral position so that it will not interfere with the backward movement of the vehicle. With this invention, a car may stop on any grade or incline and be left there without any chance of the brakes failing and the car rolling backwardly. As soon as the car starts forwardly, the left hand spirals will push the block rearwardly as they leave the left hand spiral notches if the car has moved backwardly to place the locking device in locking position.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A back stop for motor vehicles comprising a member having left hand spiral teeth thereon attached to a drive shaft of the vehicle, a slidable member having left hand spiral notches therein, means for holding the notched member against rotary movement while permitting it to have sliding movement, yieldable means for holding the sliding member against the first member whereby the teeth of the first member will enter the notches of the sliding member when the shaft is moved in a reverse direction so as to cause the sliding member to lock the shaft against movement, the ends of the teeth sliding over the end of the sliding member when the shaft is turning in an opposite direction, and means for moving said member into neutral position when the shifting lever of the vehicle has been moved to reversing position.

2. A back stop for a motor vehicle comprising a housing placed in rear of the transmission housing and receiving a part of the transmission shaft, a sleeve keyed to the shaft and arranged within the housing, left hand spiral teeth on the sleeve, a member arranged in the housing and surrounding the sleeve and having left hand spiral notches therein for receiving the teeth, the sides of the member bearing against the sides of the housing to prevent rotary movement thereof while permitting sliding movement, a grooved collar connected with the member, a plunger rod arranged in the top part of the housing, a fork carried thereby and having its prongs engaging the groove in the collar, means for holding the plunger in a forward position to cause the sliding member to engage the spiral teeth, said plunger being pushed rearwardly when the shifting lever of the vehicle is in reversing position.

3. A back stop for a motor vehicle comprising a housing placed in rear of the transmission housing and receiving a part of the transmission shaft, a sleeve keyed to the shaft and arranged within the housing, left hand spiral teeth on the sleeve, a member arranged in the housing and surrounding the sleeve and having left hand spiral notches therein for receiving the teeth, the sides of the member bearing against the sides of the housing to prevent rotary movement thereof while permitting sliding movement, a grooved collar connected with the member, a plunger rod arranged in the top part of the housing, a fork carried thereby and having its prongs engaging the groove in the collar, a spring for holding the plunger in a forward position to cause the sliding member to engage the spiral teeth, said plunger being pushed rearwardly when the shifting lever of the vehicle is in reversing position and means for adjusting the tension of the spring.

In testimony whereof I affix my signature.

PHILLIP L. LACY.